(12) United States Patent
Li et al.

(10) Patent No.: US 10,542,067 B2
(45) Date of Patent: Jan. 21, 2020

(54) METHOD AND APPARATUS FOR DISTRIBUTED BOTTLENECK COORDINATION IN DASH WITH RESOURCE PRICING

(71) Applicant: Samsung Electronics Co., Ltd., Suwon-si (KR)

(72) Inventors: Zhu Li, Plano, TX (US); Imed Bouazizi, Plano, TX (US); Youngkwon Lim, Allen, TX (US); Kyungmo Park, Suwon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 226 days.

(21) Appl. No.: 15/184,942

(22) Filed: Jun. 16, 2016

(65) Prior Publication Data
US 2016/0373500 A1    Dec. 22, 2016

Related U.S. Application Data (60) Provisional application No. 62/180,695, filed on Jun. 17, 2015.

(51) Int. Cl.
*H04L 29/06* (2006.01)
*H04L 29/08* (2006.01)

(52) U.S. Cl.
CPC ............ *H04L 65/80* (2013.01); *H04L 65/604* (2013.01); *H04L 67/02* (2013.01); *H04L 67/04* (2013.01); *H04L 67/322* (2013.01)

(58) Field of Classification Search
CPC ....... H04L 65/80; H04L 65/604; H04L 67/04; H04L 67/02; H04L 67/322
See application file for complete search history.

(56) References Cited

U.S. PATENT DOCUMENTS

| | | | |
|---|---|---|---|
| 2013/0290492 A1* | 10/2013 | ElArabawy | H04L 65/80 709/219 |
| 2013/0297743 A1 | 11/2013 | Eschet et al. | |
| 2014/0219230 A1* | 8/2014 | Schierl | H04W 72/08 370/329 |
| 2014/0269323 A1 | 9/2014 | Mahindra et al. | |
| 2014/0317241 A1 | 10/2014 | Zhao et al. | |
| 2014/0372569 A1 | 12/2014 | Bouazizi | |

FOREIGN PATENT DOCUMENTS

WO    2015022434 A1    2/2015

OTHER PUBLICATIONS

International Search Report dated Sep. 26, 2016 in connection with International Application No. PCT/KR2016/006455, 3 pages.
Written Opinion of the International Search Report dated Sep. 26, 2016 in connection with International Application No. PCT/KR2016/006455, 7 pages.
Extended European Search Report regarding Application No. 16811970.9, dated Apr. 23, 2018, 7 pages.

* cited by examiner

*Primary Examiner* — Nam T Tran (57) ABSTRACT

Systems and methods for allocating bandwidth between a coordinator device and a user equipment (UE). In the system, the UE includes a communication interface configured to communicate with the coordinator device. The UE also includes a processor configured to receive an initial resource price from the coordinator device, determine an initial resource request, and transmit the initial resource request to the coordinator device.

17 Claims, 7 Drawing Sheets

METHOD AND APPARATUS FOR DISTRIBUTED BOTTLENECK COORDINATION IN DASH WITH RESOURCE PRICING

CROSS-REFERENCE TO RELATED APPLICATION(S) AND CLAIM OF PRIORITY

The present application claims priority under 35 U.S.C. § 119(e) to U.S. Provisional Patent Application Ser. No. 62/180,695 filed Jun. 17, 2015 and entitled "METHOD AND APPARATUS FOR DISTRIBUTED BOTTLENECK COORDINATION IN DASH WITH RESOURCE PRICING." The content of the above-identified patent document is hereby incorporated by reference in its entirety.

TECHNICAL FIELD

The present application relates generally to media streaming and, more specifically, to allocating resources in a media streaming network.

BACKGROUND

Recent developments in media streaming have favored Hypertext Transfer Protocol (HTTP) as the transport protocol for many reasons. HTTP protocol stacks are widely deployed on almost every existing platform. Launching a streaming service with HTTP does not require specialized hardware or software but may be done using existing off-the-shelf servers, such as the open source Apache web server. The usage of HTTP also has the benefit of reusing existing Content Distribution Network (CDN) infrastructures. Furthermore, due to the wide use of HTTP, network address translation (NAT) traversal and firewall issues that other protocols, such as Real-time Transport Protocol (RTP), may encounter are resolved inherently for HTTP.

Several adaptive HTTP streaming solutions have been developed over the past few years. A prominent solution is one standardized by the Moving Pictures Experts Group (MPEG) and 3rd Generation Partnership Project (3GPP) called Dynamic Adaptive Streaming over HTTP (DASH). DASH is a set of technology standards by which devices operate to enable high-quality streaming of media content over networks such as the Internet. DASH defines the formats for media data delivery, as well as the procedures starting from the syntax and semantics of a manifest file called the Media Presentation Description (MPD).

However, DASH is a client driven, pull based streaming solution that lacks information regarding bottleneck resource constraints, as well as rate-distortion trade-off information for video sessions that are sharing the bottleneck. Thus, DASH cannot effectively coordinate the traffic over the bottleneck and achieve Quality of Experience (QoE) maximization for all video sessions sharing the bottleneck. Furthermore, the HTTP transport is ill-suited for wireless channels, as it interprets packet loss as congestion, and halves the transmitting window which may result in a slow start and/or loss of utilization of the channel. Therefore, DASH may be prevented from achieving the full QoE potentials of the video applications over current networks.

SUMMARY

Embodiments of the present disclosure provide methods and apparatuses for allocating resources in DASH based data streaming.

In one example embodiment, a user equipment (UE) is provided. The UE includes a communication interface configured to communicate with a coordinator device and a processor. The processor is configured to receive an initial resource price from the coordinator device, determine an initial resource request, and transmit the initial resource request to the coordinator device.

In another example embodiment, a coordinator device is provided. The coordinator device includes a network interface configured to communicate with a network and a communication interface configured to communicate with a plurality of user equipment (UE). The coordinator device also includes a processor configured to determine an initial resource price, transmit the initial resource price to at least one UE among the plurality of UE, and receive an initial resource request from the at least one UE.

In yet another example embodiment, a method performed by user equipment (UE) to allocate bandwidth is provided. The method includes receiving an initial resource price from a coordinator device, determining an initial resource request, and transmitting the initial resource request to the coordinator device.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A; B; C; A and B; A and C; B and C; and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged system or device.

Various FIGS described below may be implemented in wired or wireless communications systems. However, the descriptions of these FIGS are not meant to imply physical or architectural limitations on the manner in which different embodiments may be implemented. Different embodiments of the present disclosure may be implemented in any suitably-arranged communications systems using any suitable communication techniques.

Figure 1:
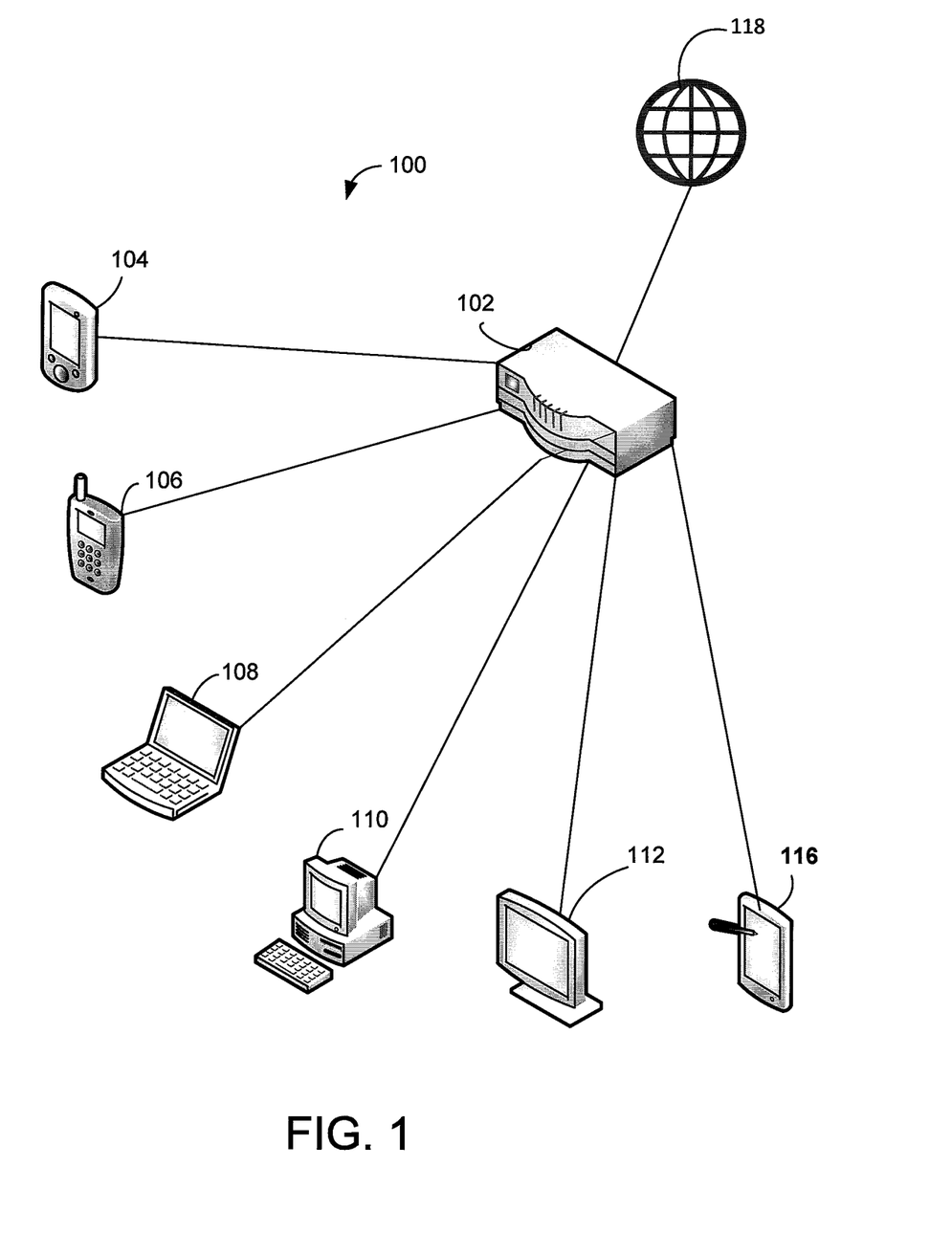
FIG. 1 illustrates an example network environment for multimedia in accordance with this disclosure.

FIG. 1 illustrates an example network environment 100 that for sharing multimedia in accordance with this disclosure. In the illustrated embodiment, the environment 100 includes a coordinator device 102 and one or more user equipments (UEs) 104 to 116 connected to the coordinator device 102 via any known wireless or wired techniques. The coordinator device 102 may represent a router (e.g., a smart router), a server, an "eNodeB" or "eNB," such as "base station" or "access point" (AP), gateway (GW), modem, etc. that may connect the one or more UEs 104 to 116 with a network 118. The network 118 may represent the Internet, a media broadcast network, an IP-based communication system, or other suitable network.

UEs 104 to 116 are in communication with the network 118 via the coordinator device 102. For example, the UEs 104 to 116 may receive streamed media data from the network 118 using DASH standards and protocols in accordance with the teachings of the present disclosure. Although one coordinator device 102 is illustrated, multiple such coordinator devices may be present in the environment 100.

In accordance with embodiments described herein, the coordinator device 102 provides broadband access to the network 118 to the UEs connected thereto. The UEs may include personal digital assistant 104, a mobile telephone or smart phone 106, a laptop 108, a personal computer (PC) 110, a display device such as a television 112, and/or a tablet computer 116. The UEs may communicate with the coordinator device 102 using any known communication techniques (e.g., Transmission Control Protocol (TCP) and the Internet Protocol (IP)). While only six UEs are depicted in FIG. 1, the environment 100 may provide broadband access to additional UEs. Other well-known terms may be used instead of "user equipment" or "UE," such as "mobile station," "subscriber station," "remote terminal," "wireless terminal," or "user device." For the sake of convenience, the terms "user equipment" and "UE" are used in this patent document to refer to remote equipment that accesses the coordinator device 102, whether the UE is a mobile device (such as a tablet computer or smartphone) or is normally considered a stationary device (such as a desktop computer or television). The UEs 104 to 116 may access voice, data, video, video conferencing, and/or other broadband services from the network 118 via the coordinator device 102.

Figure 2:
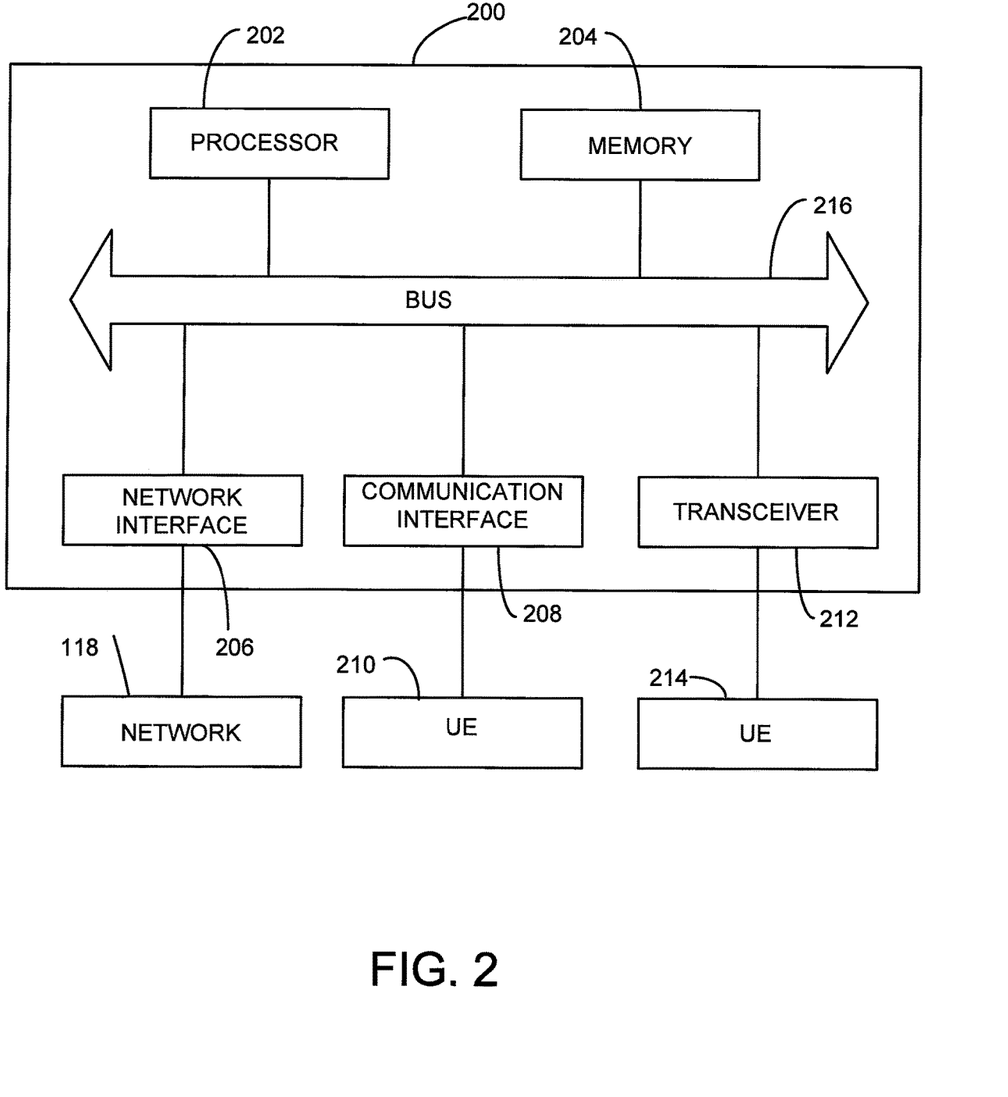
FIG. 2 illustrates an example coordinator device in accordance with this disclosure.

FIG. 2 illustrates an example coordinator device 200 in accordance with this disclosure. Coordinator device 200 includes a processor 202 and a memory 204. A network interface 206 may communicate with the network 118 to provide media to one or more of the UEs described above, a communication interface 208 may communicate with UE 210, and a communication interface or transceiver 212 may communicate with a UE 214. A bus 216 may include, for example, a circuit that interconnects the elements 202, 204, 206, 208, and 212 and transfers communication (e.g., a control message and/or data) between the elements.

The processor 202 may include one or more of a central processing unit (CPU), an application processor (AP), and/or a communication processor (CP). The processor 202 may, for example, perform an operation or data processing on control and/or communication of at least one other element of the coordinator device 200.

The memory 204 may include a volatile memory and/or a non-volatile memory. The memory 204 may store, for example, instructions or data (e.g. motion pattern information and motion data) relevant to at least one other element of the coordinator device 200. According to an embodiment, the memory 204 may store software and/or a program. For example, the program may include a kernel, middleware, an application programming interface (API), and an application (or application program). At least some of the kernel, the middleware, and the API may be referred to as an Operating System (OS).

The kernel may control or manage system resources (e.g., the bus 216, the processor 202, or the memory 204) used for performing an operation or function implemented by the other programs (e.g., the middleware, the API, or the application). Furthermore, the kernel may provide an interface through which the middleware, the API, or the application may access the individual elements of the coordinator device 200 to control or manage the system resources.

The middleware, for example, may function as an intermediary for allowing the API or the application to communicate with the kernel to exchange data.

In addition, the middleware may process one or more task requests received from the application according to priorities thereof. For example, the middleware may assign priorities for using the system resources (e.g., the bus 216, the processor 202, the memory 204, or the like) of the coordinator device 200, to at least one of the application. For example, the middleware may perform scheduling or loading balancing on the one or more task requests by processing the one or more task requests according to the priorities assigned thereto.

The API is an interface through which the applications control functions provided from the kernel or the middleware.

The network interface may communicate with network 118 via wireless or wired communication methods. The wireless communication may use at least one of, for example, long term evolution (LTE), LTE-Advance (LTE-A), code division multiple access (CDMA), wideband CDMA (WCDMA), universal mobile telecommunications system (UMTS), wireless broadband (WiBro), and global system for mobile communications (GSM), as a cellular communication protocol. In addition, the wireless communication may include, for example, short range communication such as Wi-Fi®, Bluetooth® (BT), or near field communication (NFC). The wired communication may include at least one of, for example, a universal serial bus (USB), a high definition multimedia interface (HDMI), recommended standard-232 (RS-232), and/or a plain old telephone service (POTS). The network 118 may include at least one of a communication network such as a computer network (e.g., a LAN or a WAN), the Internet, and/or a telephone network.

The communication interface 208, for example, may set communication between the coordinator device 200 and the UE 210. For example, the communication interface 208 may be connected to UE 210 through a wired communication to communicate with the UE 210. The wired communication may include at least one of, for example, a universal serial bus (USB), an ethernet connection, a high definition multimedia interface (HDMI), recommended standard-232 (RS-232), and/or a plain old telephone service (POTS).

The transceiver 212, for example, may set communication between the coordinator device 200 and the UE 214. For example, the transceiver 212 may be connected to UE 214 through a wireless communication method to communicate with the UE 210. The wireless communication may use at least one of, for example, LTE, LTE-A, code division multiple access (CDMA), wideband CDMA (WCDMA), universal mobile telecommunications system (UMTS), wireless broadband (WiBro), and global system for mobile communications (GSM), as a cellular communication protocol. In addition, the wireless communication may include, for example, short range communication such as, Wi-Fi®, Bluetooth® (BT), or near field communication (NFC).

Figure 3:
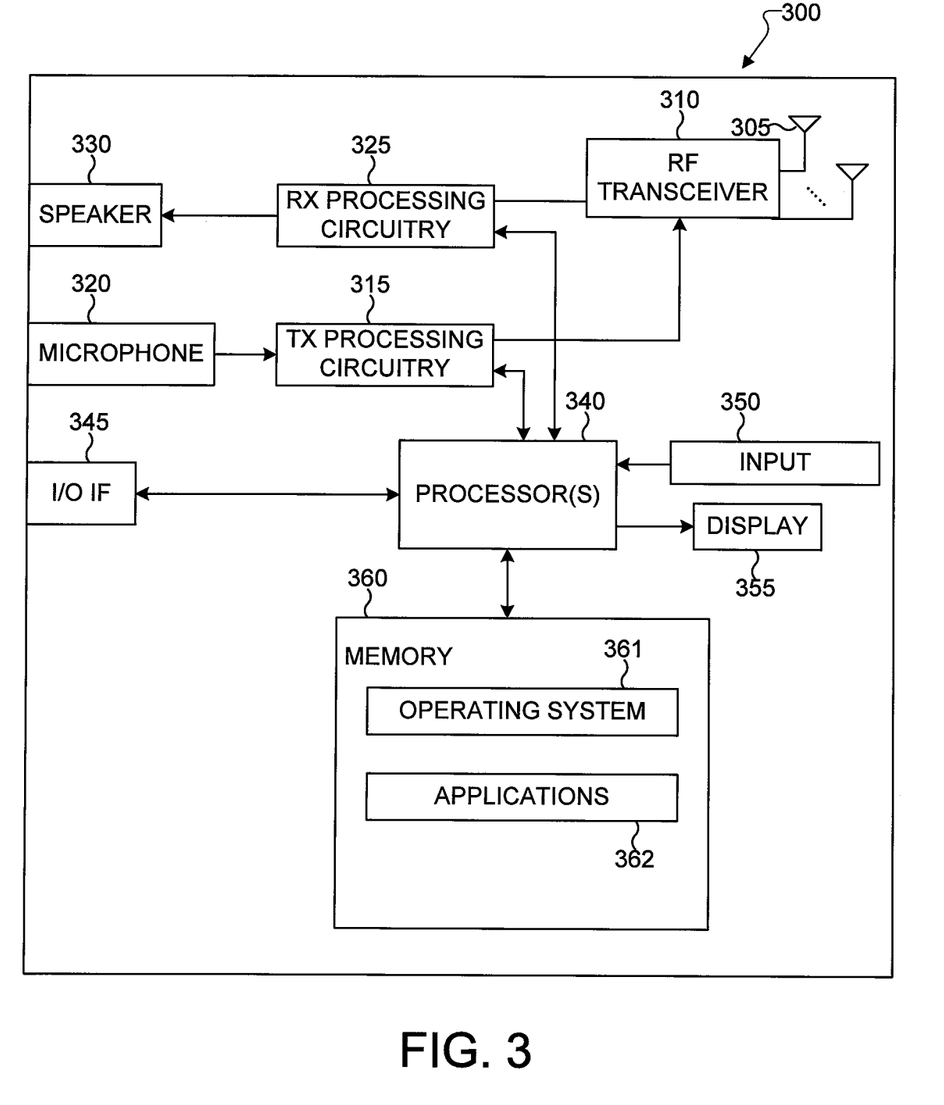
FIG. 3 illustrates an example client device in accordance with this disclosure.

FIG. 3 illustrates an example UE 300 according to embodiments of the present disclosure. The embodiment of the UE 300 illustrated in FIG. 3 is for illustration only, and the UEs 104-116 of FIG. 1 could have the same or similar configuration. However, UEs come in a wide variety of configurations, and FIG. 3 does not limit the scope of this disclosure to any particular implementation of a UE.

As shown in FIG. 3, the UE 300 includes a set of antennas 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, an input 350, a display 355, and a memory 360. The memory 360 includes an operating system (OS) 361 and one or more applications 362.

The RF transceiver 310 receives, from the set of antennas 305, an incoming RF signal transmitted by an eNB of the network 118. The RF transceiver 310 down-converts the incoming RF signal to generate an intermediate frequency (IF) or baseband signal.

The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes a procedure for determining resource prices and consumption requests in an iterative manner.

The processor 340 can move data into or out of the memory 360 as required by an executing process. In some embodiments, the processor 340 is configured to execute the applications 362 based on the OS 361 or in response to signals received from eNBs or an operator. The processor 340 is also coupled to the I/O interface 345, which provides the UE 300 with the ability to connect to other devices, such as laptop computers and handheld computers. The I/O interface 345 is the communication path between these accessories and the processor 340.

The processor 340 is also coupled to the input 350 and the display 355. The operator of the UE 300 can use the input 350 to enter data into the UE 300. The display 355 may be a liquid crystal display, light emitting diode display, or other display capable of rendering text and/or at least limited graphics, such as from web sites. In some embodiments, the processor 340 may detect network capability. For example, the processor 340 may identify a resource price from the coordinator 200 and determine the resources needed for the UE 300.

The memory 360 is coupled to the processor 340. Part of the memory 360 could include a random access memory (RAM), and another part of the memory 360 could include a Flash memory or other read-only memory (ROM). In some embodiments, the memory 360 comprising program code, that when executed by at least one processor 240, causes the at least one processor 240 to determine a resource consumption request for transmission to the coordinator 200.

Although FIG. 3 illustrates one example of UE 300, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). In another example, only one antenna may be used in set of antennas 305. Additionally, in some embodiments, the UE 300 is connected to the coordinator 200 via a wired or optical connection as discussed above and/or may not include wireless connectivity (e.g., RF transceiver 310 or antenna(s) 305. In these embodiments, the UE includes a communication interface, such as, for example, communication interface 208 as discussed above. For example, while FIG. 3 illustrates the UE 300 configured as a mobile telephone or smartphone, UEs could be configured to operate as other types of mobile or stationary devices.

Figure 4:
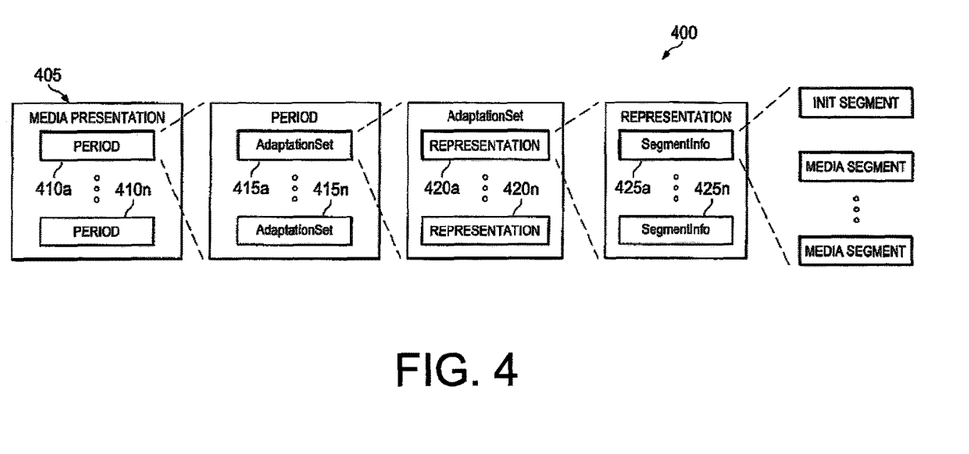
FIG. 4 illustrates an example structure of a Media Presentation Description (MPD) file in accordance with this disclosure.

FIG. 4 illustrates an example structure of a Media Presentation Description (MPD) file 400 in accordance with this disclosure. In DASH, the MPD file 400 is a manifest file that describes how to access media data of a presentation and how to provide annotations for the different content components to help a receiver or end user with content selection.

As shown in FIG. 4, an MPD file 400 describes a media presentation 405, which is divided into a set of consecutive time periods 410a-410n. Each period 410a-410n includes a set of media components that are defined as adaptation sets 415a-415n. For a specific component, an adaptation set 415a-415n includes a set of representations 420a-420n, each of which is a different encoding of the same media component (such as with different bitrates, codecs, or formats). Each representation 420a-420n may be fetched and streamed separately. In order to simplify media streaming, each representation 420a-420n may be divided into one or more media segments 425a-425n. A representation 420a-420n in the MPD file 400 describes the characteristics for that specific encoding of the content component (such as the bitrate, codec, or format). Additionally, a representation 420a-420n provides access information for each segment 425a-425n of that content representation. The MPD file 400 assumes that the segments are accessible using HTTP uniform resource locators (URLs) and optionally byte ranges inside the referenced resources. A template construction is provided to avoid referencing each single segment with its own URL in the MPD file 400. Furthermore, the segments 425a-425n can be indexed starting from index 1 and incrementing by 1 for each subsequent segment.

DASH defines at least two different media data formats, one based on the International Organization for Standardization Base Media File Format (ISOBMFF) and one based on the MPEG-2 Transport System (M2TS).

Embodiments of the present disclosure recognize that the difference between adaptive HTTP streaming solutions and progressive download lies in the ability of adaptive HTTP streaming solutions to react to congestion situations and throughput variations and adapt their bitrates accordingly. In progressive download, a media file containing a single representation of content is downloaded by a client. Multiple encodings may exist, but no appropriate description and selection mechanisms are provided for progressive download, which limits selection of the appropriate representation of the content at the start of the session through an external mechanism (such as user selection).

Embodiments of the present disclosure recognize that, in DASH, each media component of the content is provided as part of an adaptation set. An adaptation set includes one or more representations of the same content, among which the UE may select one at any time of the streaming session. A UE adapts to network conditions by switching to a representation that fits within the overall throughput budget. Embodiments of the present disclosure recognize that DASH rate adaptation is client-driven; however, the accuracy of the rate adaptation is governed by the presentation author (such as a coordinator device and/or a network), which controls the number of operation points from which the UE chooses.

A UE may monitor throughput and the level of one or more media buffers in the UE and decide whether to switch representations and, if so, which representation to select. For example, a UE may use the "segment download time to segment duration" ratio as an indication of whether the available throughput is lower, equal to, or higher than the bandwidth needed by the representation of which the media segment is being downloaded. A value higher than 1.0 indicates that the UE takes more time to download a media segment than the amount of media provided by that media segment. This is indicative of a possible forthcoming playback problem since the media reception rate is lower than the media consumption rate, which will drain the media buffer. A UE then may choose to switch to a representation with lower bandwidth requirements.

DASH relies on UEs to perform rate adaptation by switching between the representations that are provided by a content provider. However, the UEs, by themselves, may not be capable of alleviating bottlenecking that may occur because DASH may lack the information and/or mechanisms to do so. In such instances, the coordinator device may need to adjust the bandwidth of existing connections with multiple UEs to deal with bottlenecking to promote network use efficiencies. The embodiments described herein alleviate bottlenecking issues when multiple UEs are connected to the coordinator device and/or streaming data therefrom by using a marginal utility maximization based resource pricing scheme to coordinate the bottleneck resource. As used herein the term "resource" refers to bandwidth and the terms "resource pricing" or "resource price" does not refer to a monetary value, but refers to a price for the resource or bandwidth to be used by the UE in its utility to price tradeoff determination to determine an optimal operation point. The term "operation point" or "operating point" refers to the utility or QoE and the bit rate of a data stream. The operation point may be carried in or derived from the MPD. The optimal operation point that is selected may maximize the utility to price ratio.

Figure 5:
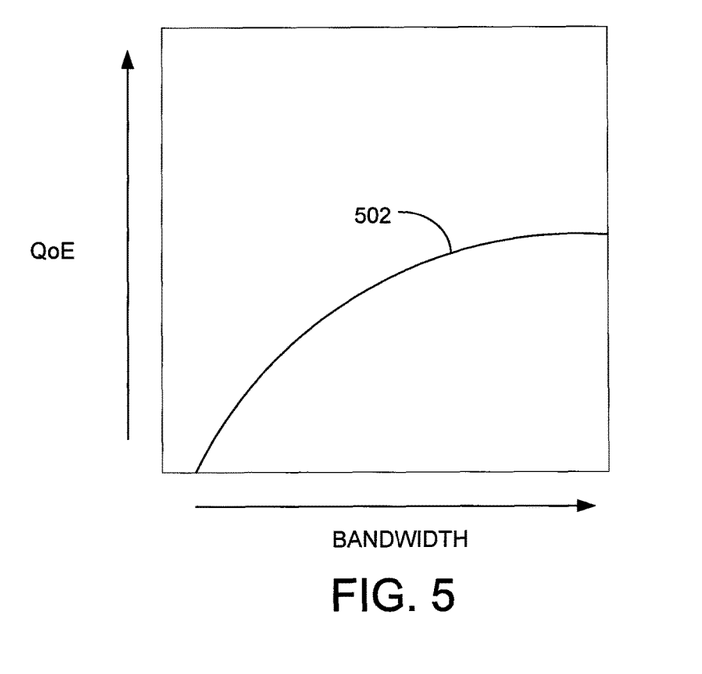
FIG. 5 illustrates a chart representing quality vs. bit rate in accordance with this disclosure.

For example, as illustrated in FIG. 5, the relationship between the QoE and the bandwidth is not linear. As the bandwidth between the coordinator device and the UE increases, the QoE of the MPD increases substantially to an operation point 502. After operation point 502, the increase in the QoE converges to a limit whereby an increase in bandwidth may not significantly increase the QoE. In view thereof, the coordinator device and UEs perform iterative processes to allocate bandwidth therebetween to determine the optimal operation point that would maximize perceived quality or utility for all the UEs connected to the coordinator device.

Figure 6:
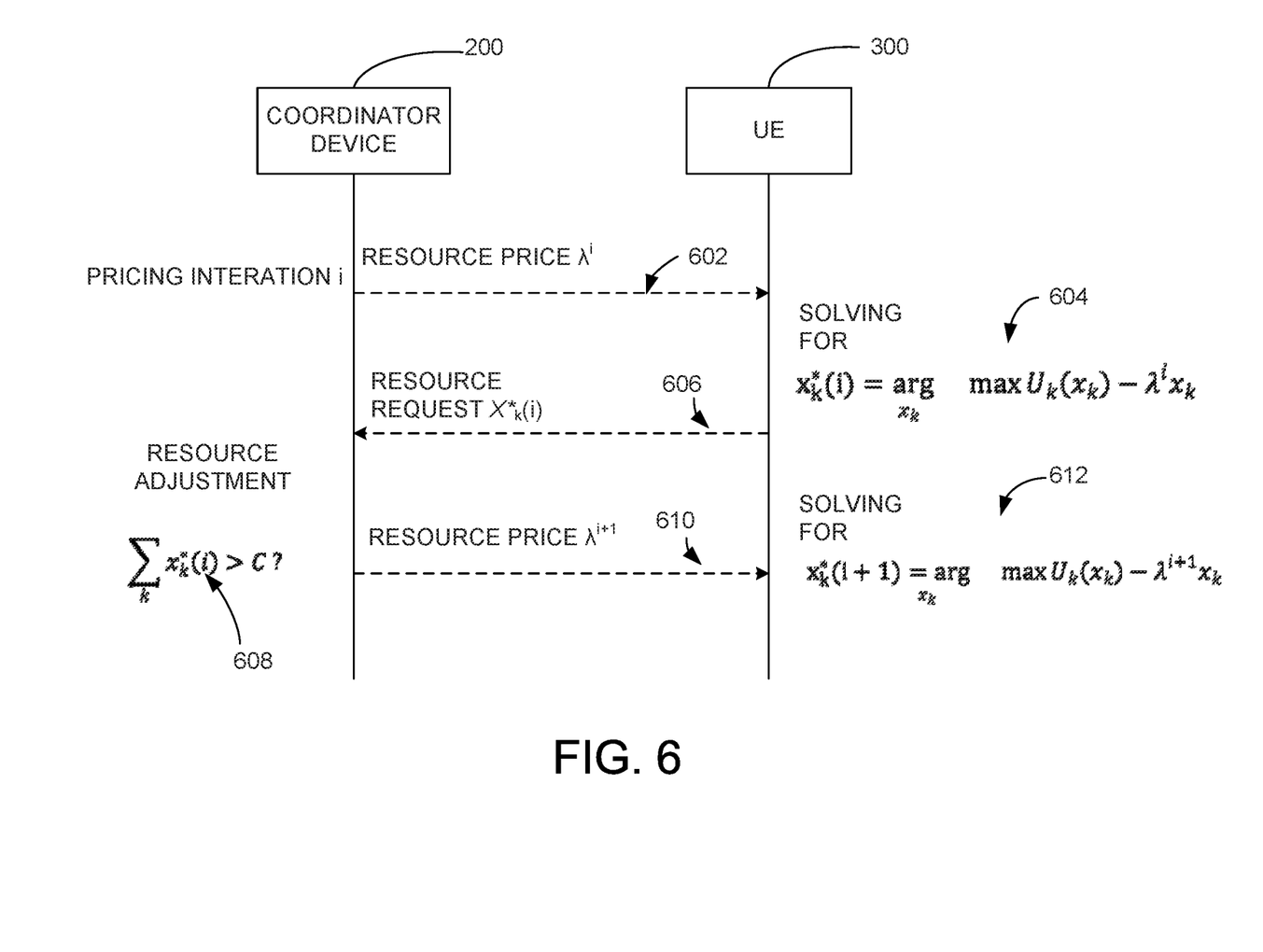
FIG. 6 illustrates an example method of allocating bandwidth in the network environment in accordance with this disclosure.
Figure 7:
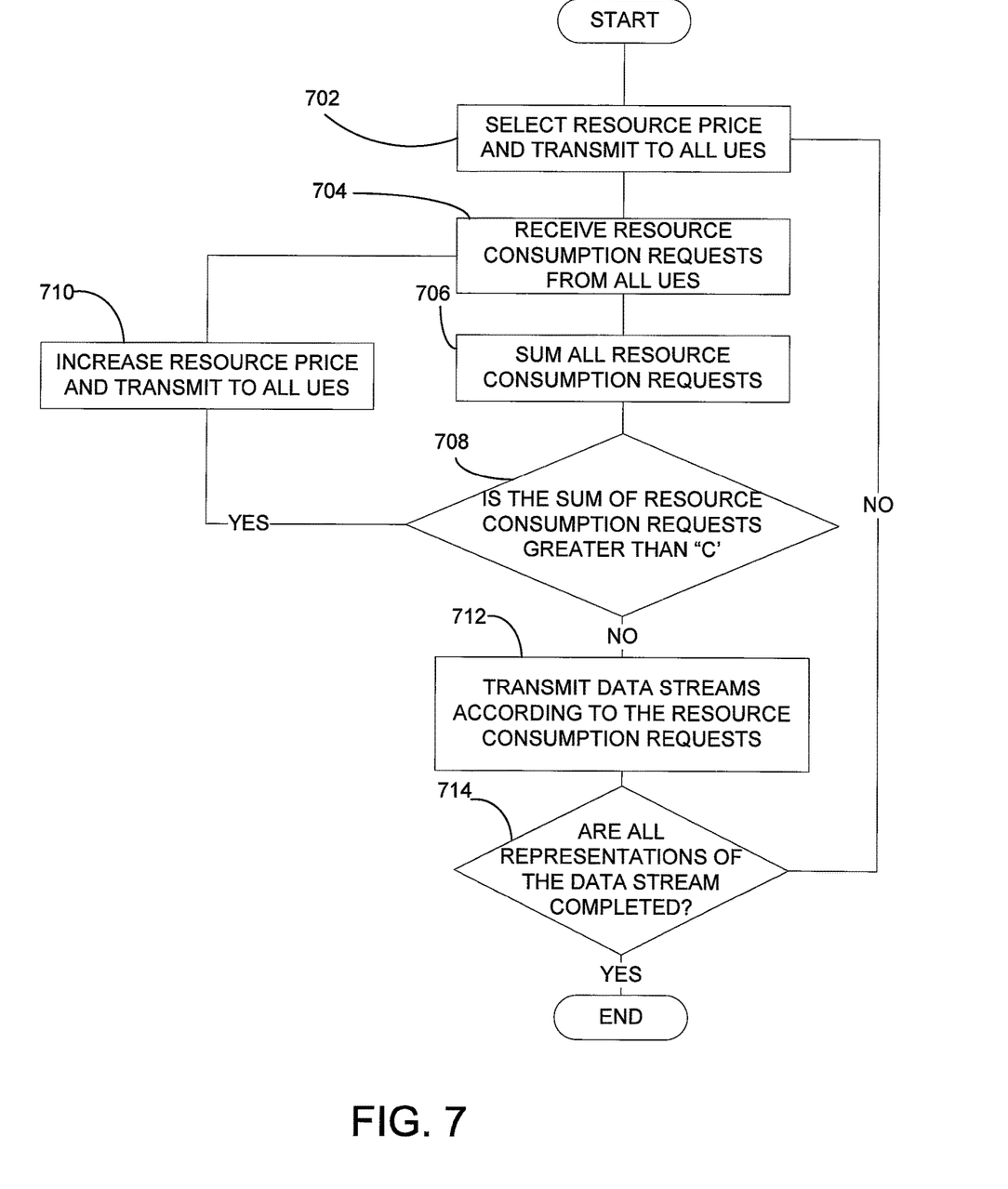
FIG. 7 illustrates an example method performed by a coordinator device in accordance with this disclosure.
Figure 8:
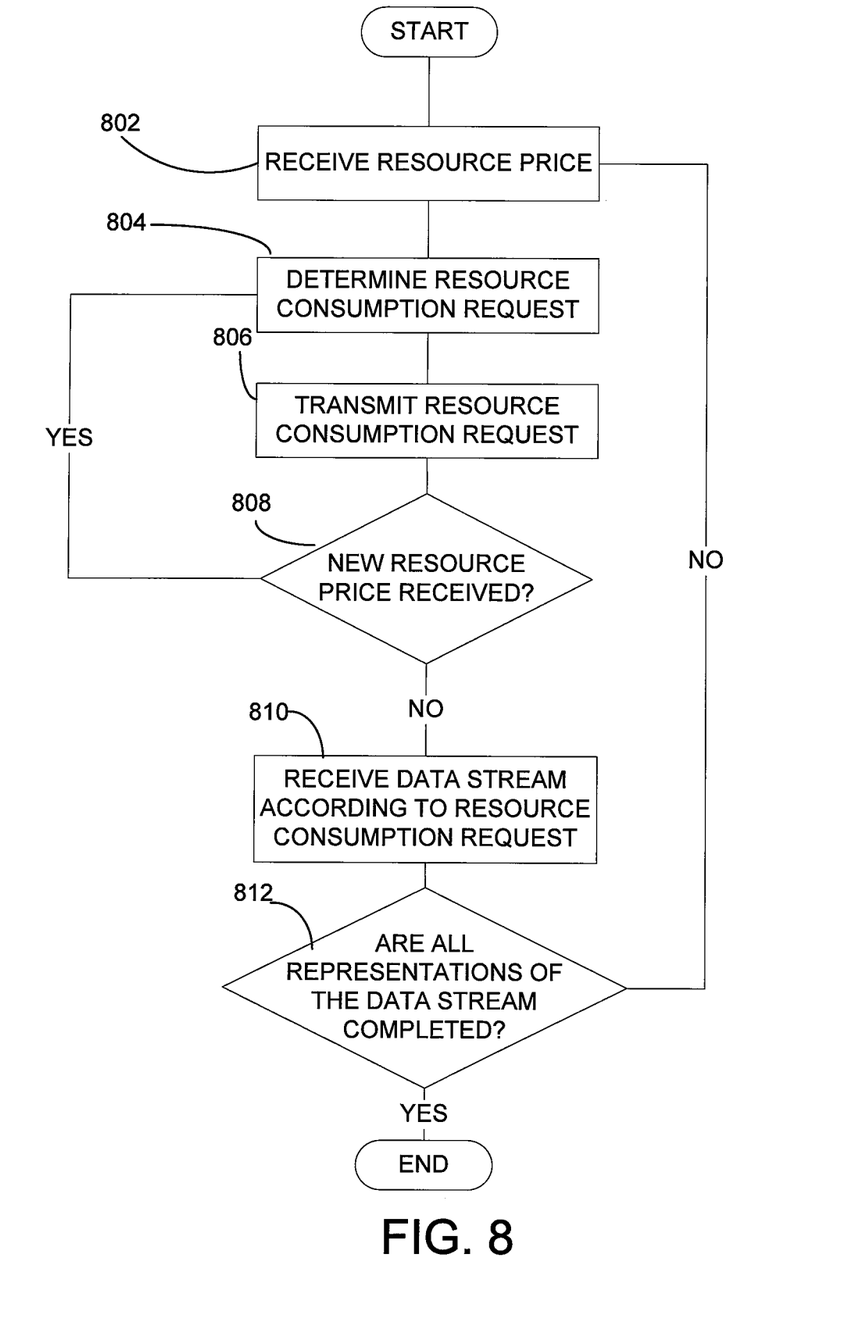
FIG. 8 illustrates an example method performed by the client device in accordance with this disclosure.

FIGS. 6 through 8 illustrate methods for allocating bandwidth in the network environment in accordance with this disclosure. FIGS. 6 through 8 will be discussed in conjunction with FIG. 1.

As shown in FIG. 6, the coordinator device 200 selects an initial resource price $\lambda^i$. The initial resource price $\lambda^i$ may be randomly selected by the coordinator device 200 or it may be selected based on other factors including, but not limited to, past resource prices utilized, time of day, number of UEs connected to the coordinator device 102, number of UEs streaming data, type of data being streamed, priorities assigned to each of the UEs, and/or bandwidth of connection between the coordinator device 102 and the network 118.

The coordinator device 102 transmits the initial resource price $\lambda^i$ to a plurality of UEs 104 to 116 (step 602). Each UE 104 to 116 extracts or derives the operation points from the data stream and searches all operating points that may maximize the equation:

$$x_k^* = \arg\max_{x_k} U_k(x_k) - \lambda^i_{x_k} \quad \text{(Equation 1)}$$

where k represents an operating point of a presentation, $_k(i)$ represents an optimal operation point at iteration i, $X_k(i)$ represents a total resource requirement for the optimal operation point $k_i$ that is transmitted to the coordinator device 102, $U_k$ represents a quality indicator at the optimal operation point, $\lambda^i$ represents the initial resource price received from the coordinator device after iteration i, and $x_k$ represents a resource requirement at the operating point. Each of the UEs determines and generates a resource consumption request that is transmitted to the coordinator device 102 (step 606).

The coordinator device sums all of the resource consumption requests and compares it to a threshold "C" (steps 608) as shown in the following equation:

$$BW_i = \Sigma_k x_k^*(i) > C \quad \text{(Equation 2)}$$

where $BW_i$ is the sum of the resource consumption requests and "C" represents the broadband capacity of the connection between the coordinator device 200 and the network 118. If the sum of the resource consumption requests is greater than "C", the coordinator device 102 increases the resource price $\lambda^{i+1}$ which is transmitted to all the UEs 104 to 116 (step 610). The coordinator device 102 may proportionally adjust the resource price $\lambda^{i+1}$ based on bandwidth excess. For example, the coordinator device 102 may determine an excess value R by subtracting the sum of the resource consumption requests from the broadband capacity "C". If "R" is less than zero the resource price is adjusted according to the following equation:

$$\lambda^{i+1} = \lambda^i \times \left(1 + \frac{R}{C}\right) \quad \text{(Equation 3)}$$

If "R" is greater than a predetermined threshold, the resource price is adjusted according to the following equation:

$$\lambda^{i+1} = \lambda^i \times \left(1 - \frac{R}{C}\right) \quad \text{(Equation 4)}$$

Each UE 104 to 116 would search all operating points again that may maximize Equation 1 based on the adjusted resource price $\lambda^{i+1}$ (step 612).

FIG. 7 illustrates an example method performed by a coordinator device in accordance with this disclosure. The method may be stored on a memory of the coordinator device (e.g., memory 204) that may be executed by a processor (e.g., processor 202). The method begins with the coordinator device 102 selecting a resource price and transmitting the selected resource price to all of the UEs 104 to 116 (step 702). For example, as part of this step, the coordinator device 102 may select a resource price randomly or based on one or more factors including past resource prices utilized, time of day, number of UEs connected to the coordinator device 102, number of UEs streaming data, type of data being streamed, and/or bandwidth of connection between the coordinator device 102 and the network 118. Each of UEs 104 to 116 calculates a resource consumption request which is received by the coordinator device 102 (step 704). The coordinator device 102 sums all of the resource consumption requests (step 706) and compares the sum to a threshold "C" as shown in Equation 2 (step 708). If the sum is greater than threshold "C", the resource price is increased and transmitted to the UEs 104-116 (step 710). If the sum is less than threshold "C", coordinator device 102 transmits the at least one representation of the data stream at the requested consumption request (step 712). The coordinator device 102 then determines of all representations of the data stream are completed (step 714). If all representations are not completed, the method returns to step 702.

FIG. 8 illustrates an example method performed by each UE 104 to 116 in accordance with this disclosure. The method may be stored on a memory of the UE (e.g., memory 304) that may be executed by a processor (e.g., processor 302). To simplify the explanation, only UE 104 will be discussed. In UE 104, a resource price is received from coordinator device 102 (step 802). The UE 104 determines a resource consumption request according to Equation 1 described above (step 804) and transmits the resource consumption request to the coordinator device 102 (step 806). The UE 104 then determines if a new resource price is received from the coordinator device 102 (step 808). If a new resource price is received, the UE 104 returns to step 804. If a new resource price is not received, the UE 104 receives at least one representation according to the requested resource consumption request (step 810). UE 104 then determines if all representations of the data stream have been received (steps 812). If all representations have not been received, the method returns to step 802.

Although FIGS. 6 through 8 illustrate examples of different methods, various changes could be made to FIGS. 6 through 8. For example, while shown as a series of steps, various steps in each FIG. could overlap, occur in parallel, occur in a different order, or occur multiple times. Further, the methods described above may be performed for each representation of a data stream, sets of representations of a data stream, or the entire data stream.

Embodiments of the present disclosure alleviate possible bottlenecking issues that may result when multiple UEs are connected to a coordinator device, such as router in a home network.

Although the present disclosure has been described with an example embodiment, various changes and modifications may be suggested to one skilled in the art. It is intended that the present disclosure encompass such changes and modifications as fall within the scope of the appended claims.

What is claimed is:

1. A user equipment (UE) for receiving a media content using dynamic adaptive streaming over Hypertext Transfer Protocol (HTTP) DASH, comprising:
   a communication interface configured to communicate with a coordinator device; and
   a processor configured to:
      receive one or more representations of the media content from a content provider, wherein each representation includes a bit rate for streaming the media content;

receive an initial resource price from the coordinator device, wherein the initial resource price is selected by the coordinator device as a price weighting a resource;

determine an initial resource consumption required for receiving the media content based on the bit rate included in the one or more representations and the initial resource price;

transmit an initial resource request for indicating the initial resource consumption to the coordinator device; and receive at least one representation based on the initial resource request.

2. The UE of claim 1, wherein the initial resource consumption is determined based on an equation:

$$x_k^*(i) = \arg\max_{x_k} U_k(x_k) - \lambda^i x_k$$

where k represents an operating point of a presentation, $x_k(i)$ represents an optimal operation point at iteration i, $X_k(i)$ represents a total resource requirement for the optimal operation point $k_i$, $U_k$ represents a quality indicator at the optimal operation point, $\lambda^i$ represents the initial resource price received from the coordinator device after iteration i, and $x_k$ represents a resource requirement at the operating point.

3. The UE of claim 2, wherein the resource requirement $x_k$ is a bandwidth requirement that results from consuming the presentation at operating point k.

4. The UE of claim 1, wherein the processor is further configured to:

receive a subsequent resource price from the coordinator device;

determine a subsequent resource consumption required for receiving the media content based on the bit rate included in the one or more representations and the subsequent resource price; and transmit a subsequent resource request for indicating the subsequent resource consumption to the coordinator device.

5. The UE of claim 1, wherein the initial resource price is randomly selected.

6. A coordinator device comprising:

a network interface configured to communicate with a network;

a communication interface configured to communicate with a plurality of user equipment (UE); and a processor configured to:

determine an initial resource price, wherein the initial resource price is used by the plurality of UE as a price weighting a resource;

transmit the initial resource price to at least one UE among the plurality of UE;

receive an initial resource request from the at least one UE, wherein the initial resource request from the at least one UE includes an initial resource consumption required for receiving a media content based on a streaming bit rate included in one or more representations of the media content and the initial resource price; and transmit at least one representation based on the initial resource request.

7. The coordinator device of claim 6, wherein the processor is further configured to compare a sum of the initial resource consumption to a threshold.

8. The coordinator device of claim 7, wherein the processor is further configured to:

determine a subsequent resource price when the sum of the initial resource consumption is greater than the threshold;

transmit the subsequent resource price to the at least one UE among the plurality of UE; and receive a subsequent resource request from the at least one UE, wherein the subsequent resource request from the at least one UE includes a subsequent resource consumption required for receiving a media content based on a streaming bit rate included in the one or more representations of the media content and the subsequent resource price.

9. The coordinator device of claim 8, wherein the subsequent resource price is determined based on a difference between the sum of the initial resource consumption and the threshold.

10. The coordinator device of claim 6, wherein the initial resource price is randomly selected.

11. The coordinator device of claim 6, wherein the initial resource price is selected based on at least one of a past resource price, a time of day, a number of UEs connected to the coordinator device, a number of UEs receiving a data stream, a type of data stream, or a bandwidth between the coordinator device and a network.

12. The coordinator device of claim 6, wherein the coordinator device is a router, a server, a base station, or an access point.

13. A method performed by user equipment (UE) to allocate bandwidth, the method comprising:

receiving one or more representations of media content from a content provider, wherein each representation includes a bit rate for streaming the media content;

receiving an initial resource price from a coordinator device, wherein the initial resource price is selected by the coordinator device as a price weighting a resource;

determining an initial resource consumption required for receiving the media content based on the bit rate included in the one or more representations and the initial resource price;

transmitting an initial resource request for indicating the initial resource consumption to the coordinator device; and receiving at least one representation based on the initial resource request.

14. The method of claim 13, wherein the initial resource consumption is determined based on an equation:

$$x_k^*(i) = \arg\max_{x_k} U_k(x_k) - \lambda^i x_k$$

where k represents an operating point of a presentation, $x_k(i)$ represents an optimal operation point at iteration i, $X_k(i)$ represents a total resource requirement for the optimal operation point $k_i$, $U_k$ represents a quality indicator at the optimal operation point, $\lambda^i$ represents the initial resource price received from the coordinator device after iteration i, and $x_k$ represents a resource requirement at the operating point.

15. The method of claim 14, wherein the resource requirement $x_k$ is a bandwidth requirement that results from consuming the presentation at operating point k.

16. The method of claim 13, further comprising:

receiving a subsequent resource price from the coordinator device;

determining a subsequent resource consumption required for receiving the media content based on the bit rate included in the one or more representations and the subsequent resource price; and transmitting a subsequent resource request for indicating the subsequent resource consumption to the coordinator device.

17. The method of claim 13, wherein the initial resource price is randomly selected.

* * * * *